(12) United States Patent
Novick et al.

(10) Patent No.: US 8,934,378 B1
(45) Date of Patent: Jan. 13, 2015

(54) RESILIENT CACHE-BASED TOPOLOGY DETECTION OF A DYNAMIC CLUSTER

(71) Applicants: Ivan Donald Novick, Sunnyvale, CA (US); Sharad Kala, Sunnyvale, CA (US); Tim D. Heath, Belmont, CA (US)

(72) Inventors: Ivan Donald Novick, Sunnyvale, CA (US); Sharad Kala, Sunnyvale, CA (US); Tim D. Heath, Belmont, CA (US)

(73) Assignee: EMC Corporation, Hopkinton, MA (US)

( * ) Notice: Subject to any disclaimer, the term of this patent is extended or adjusted under 35 U.S.C. 154(b) by 188 days.

(21) Appl. No.: 13/632,063

(22) Filed: Sep. 30, 2012

(51) Int. Cl.
*H04L 12/28* (2006.01)
*H04L 12/24* (2006.01)
*H04L 12/715* (2013.01)
*H04L 12/751* (2013.01)

(52) U.S. Cl.
CPC ............... *H04L 41/12* (2013.01); *H04L 45/46* (2013.01); *H04L 45/02* (2013.01)
USPC ....................................................... 370/255

(58) Field of Classification Search
USPC ................................................ 370/255, 254
See application file for complete search history.

(56) References Cited

U.S. PATENT DOCUMENTS

| | | | | |
|---|---|---|---|---|
| 6,671,776 | B1 * | 12/2003 | DeKoning .................... | 711/114 |
| 7,383,330 | B2 * | 6/2008 | Moran et al. .................. | 709/223 |
| 7,580,711 | B1 * | 8/2009 | Kraiem et al. ................ | 455/446 |
| 2012/0294192 | A1 * | 11/2012 | Masood et al. ............... | 370/255 |
| 2013/0322298 | A1 * | 12/2013 | Alexander et al. ............ | 370/255 |

OTHER PUBLICATIONS

Margaret Rouse, "Fibre Channel port names," WhatIs.com, Apr. 2011.*

* cited by examiner

*Primary Examiner* — Thai Hoang
*Assistant Examiner* — Kenneth P Hunt
(74) *Attorney, Agent, or Firm* — Barry N. Young (57) ABSTRACT

The constituency and topology of a dynamic network cluster comprising a plurality of hosts and a plurality of Level 2 network switches is automatically detected and mapped at selected intervals of time to provide current real time topology mappings. Network connections are determined by identifying the MAC addresses of host interfaces of hosts that a part of the cluster and the MAC addresses of the particular host interfaces connected to the switch ports of each switch. Resiliency to account for changes to the cluster between intervals is provided by caching cluster mapping and constituency information, and using the cached information from a previous update round to supplement information detected during a current round.

17 Claims, 10 Drawing Sheets

Switch Cluster Table

| SWITCH |
|---|
| SW1 |
| SW2 |
| SW3 |
| SW4 |

Figure 5

Logical Cluster Host Table

| HOST |
|---|
| H1 |
| H2 |
| H3 |
| ... |
| H16 |

Figure 4

SWITCH STATE TABLE

| Switch Name | SW Port | MAC Address |
|---|---|---|
| SW1 | 1 | xxxi |
| SW1 | 2 | xxxj |
| SW1 | 3 | xxxk |
| SW1 | 4 | xxxl |
| SW1 | 5 | xxxa |
| SW1 | 6 | xxxb |
| SW1 | 7 | xxxc |
| SW1 | 8 | xxxd |
| ... | ... | ... |
| SW4 | 13 | xxxm |
| SW4 | 14 | xxxn |
| SW4 | 15 | xxxo |
| SW4 | 16 | xxxp |

Figure 6

HOST INFO TABLE

| Host | I/F | MAC Address |
|---|---|---|
| H1 | H1-1 | xxxi |
| H1 | H1-2 | xxxj |
| H1 | H1-3 | xxxk |
| H1 | H1-4 | xxxl |
| H2 | H2-1 | xxxa |
| H2 | H2-2 | xxxb |
| H2 | H2-3 | xxxc |
| H2 | H2-4 | xxxd |
| ... | ... | ... |
| H16 | H16-1 | xxxm |
| H16 | H16-2 | xxxn |
| H16 | H16-3 | xxxo |
| H16 | H16-4 | xxxp |

Figure 7

HOST INFO CACHE TABLE

| Host | I/F | MAC Address |
|---|---|---|
| H1 | H1-1 | xxxi |
| H1 | H1-2 | xxxj |
| H1 | H1-3 | xxxk |
| H1 | H1-4 | xxxl |
| H2 | H2-1 | xxxa |
| H2 | H2-2 | xxxb |
| H2 | H2-3 | xxxc |
| H2 | H2-4 | xxxd |
| H16 | H16-1 | xxxm |
| H16 | H16-2 | xxxn |
| H16 | H16-3 | xxxo |
| H16 | H16-4 | xxxp |

Figure 8

CLUSTER MAP TABLE

| Host | I/F | MAC Addr | SW | Port |
|------|------|----------|------|------|
| H1 | H1-1 | xxxi | SW1 | 1 |
| H1 | H1-2 | xxxj | SW1 | 2 |
| H1 | H1-3 | xxxk | SW1 | 3 |
| H1 | H1-4 | xxxl | SW1 | 4 |
| H2 | H2-1 | xxxa | SW1 | 5 |
| H2 | H2-2 | xxxb | SW1 | 6 |
| H16 | H16-1 | xxxm | SW4 | 13 |
| H16 | H16-2 | xxxn | SW4 | 14 |
| H16 | H16-3 | xxxo | SW4 | 15 |
| H16 | H16-4 | xxxp | SW4 | 16 |

Figure 9

CLUSTER MAP CACHE TABLE

| Host | I/F | MAC Addr | SW | Port |
|---|---|---|---|---|
| H1 | H1-1 | xxxi | SW1 | 1 |
| H1 | H1-2 | xxxj | SW1 | 2 |
| H1 | H1-3 | xxxk | SW1 | 3 |
| H1 | H1-4 | xxxl | SW1 | 4 |
| H2 | H2-1 | xxxa | SW1 | 5 |
| H2 | H2-2 | xxxb | SW1 | 6 |
| ... | ... | ... | ... | ... |
| H16 | H16-1 | xxxm | SW4 | 13 |
| H16 | H16-2 | xxxn | SW4 | 14 |
| H16 | H16-3 | xxxo | SW4 | 15 |
| H16 | H16-4 | xxxp | SW4 | 16 |

RESILIENT CACHE-BASED TOPOLOGY DETECTION OF A DYNAMIC CLUSTER

BACKGROUND

This invention relates generally to network clusters of distributed processing hosts, and more particularly to the automatic detection of the topology of dynamically changing network clusters.

Large data centers, as of enterprises, may comprise networks of hundreds or more physically interconnected processing nodes, each processing node having a host computer connected to one or more Layer 2 network switches. The processing nodes (hosts) may be organized into different logical clusters for use by different users, different groups and for different purposes. For instance, one logical cluster may be a large distributed database for warehousing enterprise data.

Large clusters are very dynamic, as hosts and switches are constantly being added, removed or going down. For these and other reasons, network technicians and administrators need current network topology information that maps hosts to switches for maintenance and administrative tasks. For example, if a switch shows warnings that it may fail and need to be replaced in the near future, the administrator will need mapping information to move hosts off of the failing switch. The mapping information should be current and should correspond to the physical layout of the network wiring so that effected hosts can be identified and migrated safely and so that the workloads running on those hosts can be shutdown in a safe way. If errors have occurred on a particular switch port, it may be desirable to try to correlate them to the particular host located on that switch port so that the host can be checked for potential performance issues associated with the switch port errors. Still another reason for network topology information may be the need to know the Ethernet MAC address of a host that is powered off. The MAC addresses of hosts connected to switch ports can be determined from the switch, but if the administrator does not know which host is connected to which switch port, he will not know which MAC address corresponds to which host. The MAC address could be useful in a DHCP configuration file where hosts that are powered off will be reinstalled with a new operating system (OS) using DHCP and PXE booting based installation of the OS. The DHCP configuration file needs the MAC address for each host in order to be correlated to the target IP address and OS installation personality.

Since hosts may fail or be powered down temporarily at any time, mapping data must be tolerant of and account for these occurrences intelligently. In this environment a "logical cluster" comprises a set of hosts considered to be part of a cluster or group in an administrative domain that may or may not have some shared application logic or uses. Current cluster mapping information is necessary for administration and maintenance of the cluster. Since other hosts that are not part of the logical cluster may be connected to the same switches as hosts of the logical cluster, there is a need to map accurately the hostnames of the hosts in the logical cluster to the cluster switches and to cluster switch port locations. Moreover, there is a need for the mapping to be frequently updated so that it is current in real time and is readily available.

One approach to generating topology mapping data has been to connect to all switches that are part of the logical cluster and obtain the MAC address and port information for each location in the switch, and then connect to all hosts in the logical cluster and get the MAC address and hostname. Mapping information may then be obtained by joining this data using the common MAC address field in order to map the hostname to the switch name and port location. There are, however, several problems with this approach. If a host is down or otherwise not available, that host would be excluded from the mapping data or the mapping generation process would fail. Likewise, if a switch is down during generation of the mapping data, all hosts connected to that switch would also be excluded from the mapping data or the generation of the mapping data would fail. Thus, this approach can produce inaccurate or incomplete mapping information and lacks resiliency.

There is a need for an approach for timely, robust and resilient topology detection and mapping of a dynamic cluster that addresses the foregoing and other problems with known approaches, and it is to these ends that the invention is directed.

DESCRIPTION OF PREFERRED EMBODIMENTS

The invention is particularly well adapted for use with dynamic clusters of large distributed computing networks, such as distributed databases, and will be described in that context. It will be appreciated, however, that this is illustrative of only one utility of the invention, and that the invention is applicable to other types of distributed computing networks.

Figure 1:
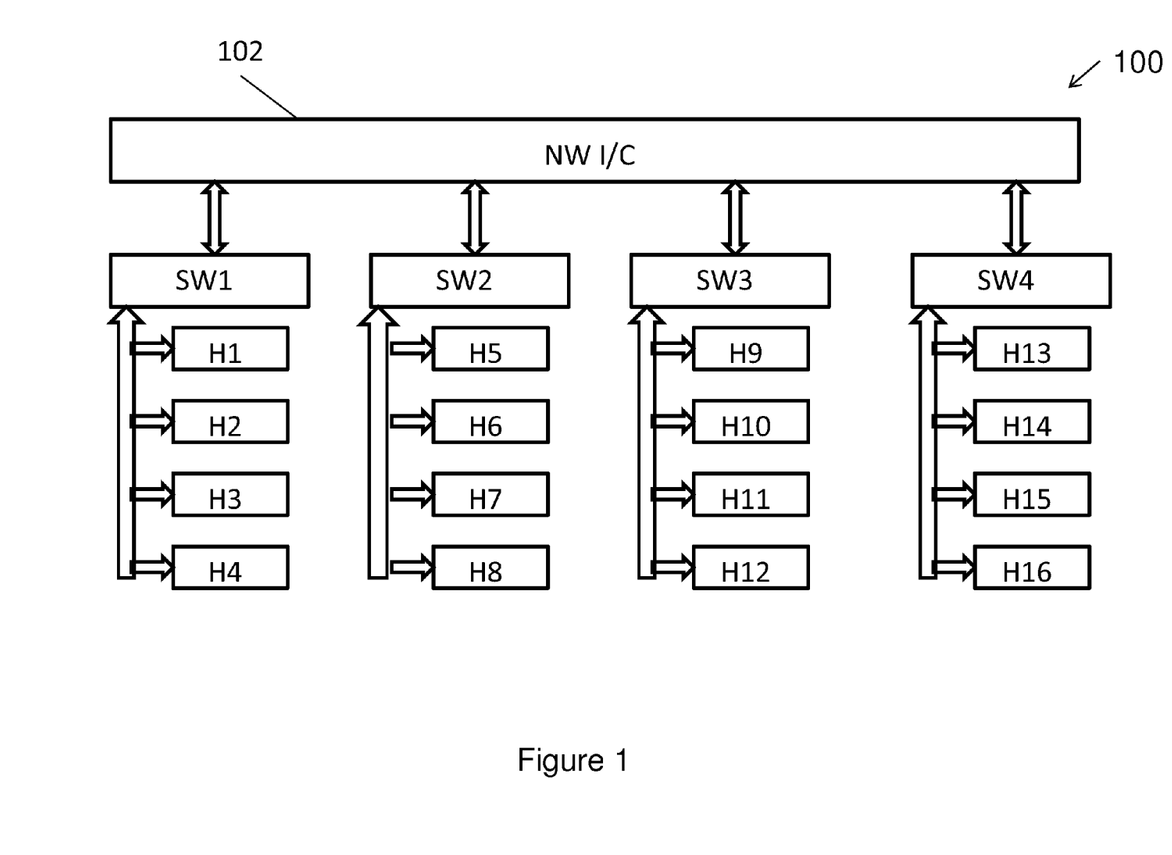
FIG. 1 illustrates the architecture of a logical network cluster of the type with which the invention may be employed.

FIG. 1 illustrates the architecture of a logical cluster 100 of a distributed computing network of the type with which the invention may be employed. As illustrated in the figure, logical cluster 100 may comprise a plurality of OSI Level 2 network switches, four such switches SW1-SW4 being shown in the figure, connected to a plurality of processing nodes, referred to herein as hosts, sixteen hosts H1-H16 being shown in the figure. Logical cluster 100 may comprise only a small part of a large data center physical network comprising a much larger plurality of network switches and hosts. Each switch may also be connected to a network interconnect (I/C) 102 of the physical network. Indeed, there may be a number of different logical clusters within the data center physical network. Logical clusters are identified and constructed by network administrators who assign groups of physical processing nodes, switches, and other components of the network to a logical cluster for a single purpose or for a multitude of different purposes. Although for convenience in describing the invention FIG. 1 illustrates the logical cluster 100 as comprising sixteen hosts H1-H16 connected to four switches SW1-SW16, it will be appreciated that there may be fewer or greater numbers of both hosts and switches that comprise the logical cluster. Moreover, not every host connected to a particular switch needs to be part of the same logical cluster.

The constituency and topology of a logical cluster changes dynamically in time as hosts are added to the cluster to increase capacity, hosts are removed as when they are no longer needed, when they fail and need to be replaced, or for routine maintenance, when network switches fail or otherwise need to be replaced or supplemented, and for a variety of other reasons. Generally, the larger the cluster, the more dynamic it is. Accordingly, it is essential for maintenance and administrative personnel to have readily available, accurate, current real time network topology mappings that describe the constituency and the wiring of the cluster in order to quickly identify relevant cluster components. The topology maps should be resilient and change as quickly and dynamically as does the topology of the logical cluster so that they accurately depict the topology at any given time.

As will be described in more detail below, the invention provides processes which meet the foregoing requirements by providing topology determining processes that detect and identify in real time the particular hosts and host interfaces which are connected to particular ports of the Layer 2 network switches that comprise the logical cluster, and provide current topology mapping information to administrative and technical personnel. As will be described, processes in accordance with the invention are able to identify hosts which are not part of a logical cluster that are connected to a switch which is part of the logical cluster in a shared environment, and ignore such hosts for the purposes of mapping the logical cluster. The invention is resilient to the impact of temporary or permanent failures of hosts or switches, and can handle each host in the logical cluster being connected via multiple network interfaces to multiple switches.

Figure 2:
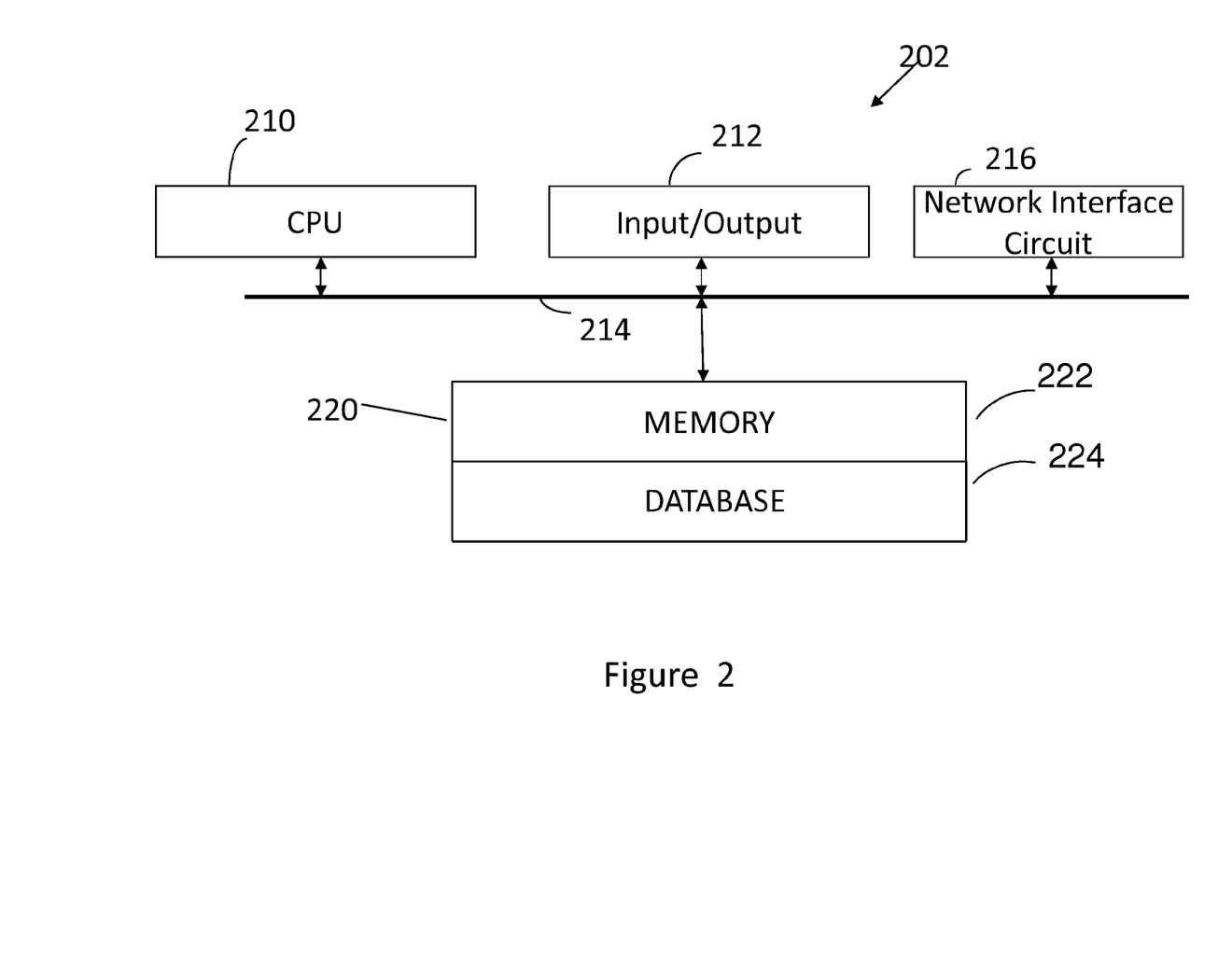
FIG. 2 illustrates the architecture of a processing node or host of the cluster of FIG. 1.

FIG. 2 illustrates an example of the architecture of a processing node 202 that is configured to perform processes and operations in accordance with the invention. Node 202 may be a master node that controls the logical cluster, and may be one of the nodes H1-H16 of the logical cluster or a network node external to the logical cluster that has access to the logical cluster. The nodes of the logical cluster may have a similar architecture to node 202. Node 202 may comprise a host computer 210 (which may comprise a single CPU or may be a multi-processor system comprising a plurality of CPUs) connected to input/output (I/O) devices 212 by a bus 214. The I/O devices may be standard computer system input and output devices. A network interface circuit 216 may also be connected to bus 214 to allow the node to operate in the networked environment of FIG. 1. The network interface circuit may provide four separate network interfaces for the CPU, for instance, that connect to one or more of the switches SW1-SW4 of the logical cluster 100. Node 202 may further have memory 220 comprising non-transitory physical computer readable storage media connected to the bus that embodies executable instructions to control the operations of the host CPU. Memory 220 may include a main memory 222 comprising instructions that control the host CPU to operate in accordance with the invention, as will be described, and may contain other storage 224 for storing a database, for example, for storing information about the logical cluster. Node 202 may comprise, for instance, the master node of a distributed shared-nothing database.

Figure 3:
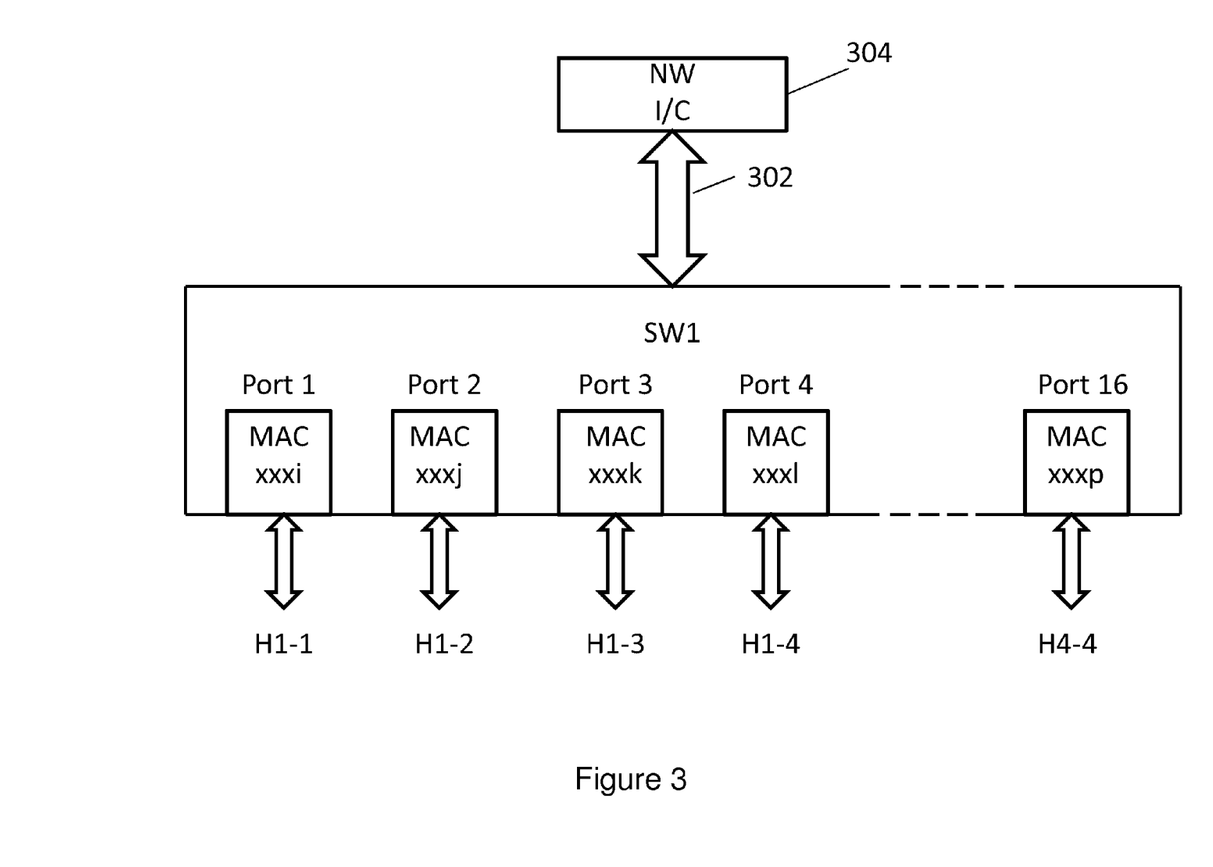
FIG. 3 illustrates the architecture of a Level 2 network switch of the network cluster of FIG. 1.

FIG. 3 illustrates the architecture of a Level 2 network switch that may be employed in the logical cluster of FIG. 1 for interfacing hosts to the network. All switches SW1-SW4 may have the generally same architecture with the same number or a different number of ports. FIG. 1 depicts switch SW1 as an example. As shown, switch SW1 is a multi-port switch, having, e.g., sixteen ports, Port 1-Port 16, for interfacing to hosts of the network, and may have an additional interface 302 for interfacing the switch to a network interconnect (I/C) 304. As described above, the switches SW1-SW4 may interface hosts to the network that are not part of the logical cluster 100. For ease of description, however, it will be assumed that all four switches are sixteen port switches that are exclusive to the logical cluster, that all hosts H1-H16 are part of the logical cluster, and that each host has four network interfaces connected to the switches. As shown in FIG. 3, the four interfaces of host H1, i.e., H1-1, H1-2, H1-3 and H1-4, may be connected to SW1 Ports 1-4, respectively. Hosts H2, H3 and H4 may also be connected to switch SW1, as shown in FIG. 1. Again for ease of description, it may be assumed that the four interfaces (H2-1, H2-2, H2-3 and H2-4) of host H2 are connected to Ports 5-8, and that the four interfaces of each of hosts H3 and H4 are connected to switch Ports 9-11 and 12-16, respectively. FIG. 3 shows that host H4 interface H4-4 may be connected to switch Port 16, for example.

As is well known, a network interface of each physical network device has a unique MAC (Media Access Control) address, typically a 16-digit hex code or the like, that is used for identifying that device and for routing data to and from the device. Each port (1-16) of switch SW1 obtains the MAC address of the physical interface of an active device connected to the port in a well know manner, as by pinging or an SSH process. Accordingly, as shown in the figure, switch Ports 1-4 obtain the MAC addresses xxxi, xxxj, xxxk, and xxxl, of host H1 interfaces H1-1, H1-2, H1-3 and H1-4, respectively, connected to those ports. Similarly, the remaining ports 5-16 of the switch obtain the MAC addresses of the H2-H4 interfaces connected to such ports. Port 16 obtains the MAC address xxxp for interface H4-4. As indicated in FIG. 1, hosts H5-H16 may likewise be interfaced to switches SW2-SW4. Switches SW2-SW4 may be similar to switch SW1 and also automatically obtain the MAC addresses of the host interfaces connected to their ports.

Although the switches may automatically obtain the MAC addresses of the hosts connected to their ports, the administrator will not know which hosts correspond to the MAC addresses and will not know which particular host is connected to which port unless there has previously been a topology mapping of the logical cluster. In the past, this is typically required a manual mapping of the cluster to correlate host names to switch ports, and the mapping has lacked resiliency and accuracy since it has been unable to maintain current real time information due to dynamic changes in the constituency and state of the logical cluster.

As will be described below, the invention addresses these issues by providing a resilient cache-based topology detection process that automatically detects and maps changes in the network topology of the logical cluster and maintains current topology mapping information. Processes in accordance with the invention automatically determine which hosts are connected to which ports of the Layer 2 network switches of the logical cluster, and can handle a dynamic cluster where hosts and switches are frequently added and removed. The processes can automatically detect not only which hosts are connected to particular switches, but which host interfaces are connected to which switch ports, and it is resilient to the impact of temporary or permanent failures in the cluster. The invention further comprises a series of tables that that contain cluster mapping information and that are automatically updated by the inventive process according to a selected schedule. Processes in accordance with the invention may comprise executable instructions stored in computer readable media that control the operation of a computer in a master node or master host, such as host 202 of FIG. 2, of the logical cluster. The instructions may be stored in computer readable media, such as memory 222, and the tables containing the cluster mapping information may be stored in a relational database, such as database 224, or as a series of flat files, or in memory 222. Prior to describing a preferred embodiment of a topology detection and mapping process in accordance with the invention, preferred embodiments of the tables which contain mapping information will first be described.

Figure 4:
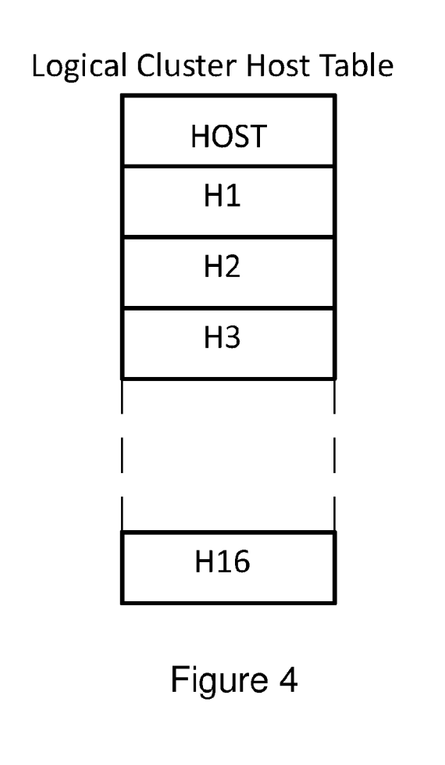
FIG. 4 illustrates a logical cluster host table in accordance with the invention.
Figure 5:
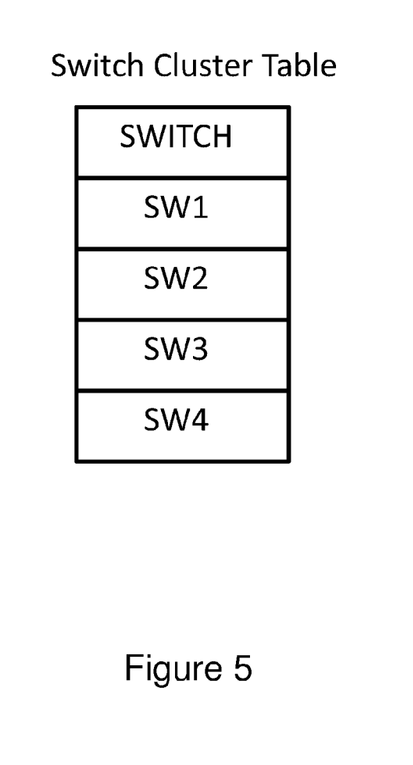
FIG. 5 illustrates a switch cluster table in accordance with the invention.

FIGS. 4 and 5 illustrate, respectively, embodiments of a logical cluster host table and a switch cluster table in accordance with the invention. As shown, the logical cluster host table comprises a single column which indicates the hostnames (as strings) of the hosts that are part of the logical cluster. For the preferred embodiment of the invention being described, and is illustrated in FIG. 1, the hosts which are part of a logical cluster comprise hosts H1-H16, and these hostnames are listed in the table. Similarly, the switch cluster table comprises a single column which indicates the switch names of the network switches that are part of the logical cluster. In the example illustrated, these comprise switches SW1-SW4. The logical cluster host table and the switch cluster table may be populated manually by the administrator, or alternatively programmatically.

Figure 6:
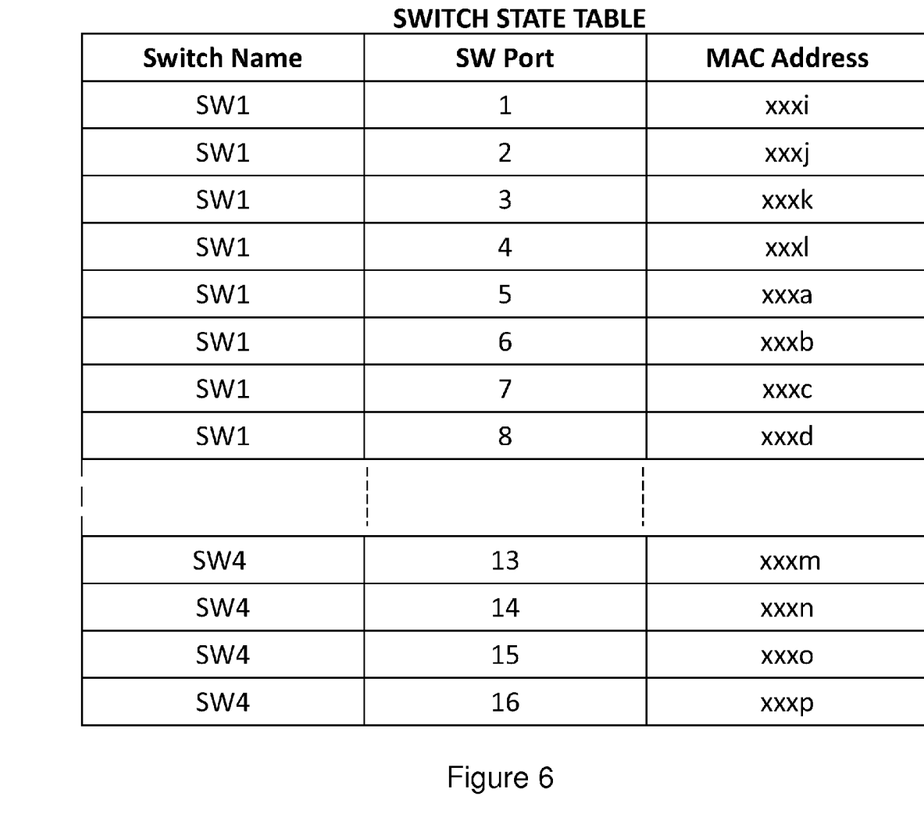
FIG. 6 illustrates a switch state table in accordance with the invention.

FIG. 6 illustrates a switch state table in accordance with the invention. As shown in the figure, the table may comprise three columns that indicate for each of the currently accessible switches SW1-SW4 listed in the switch cluster table the switch name as a string, the switch port as a number, and the MAC address as a string of the physical device connected to each port. The table may be populated by connecting to each switch of the logical cluster listed in the switch cluster table, and querying the switch to determine the switch ports and the MAC address of the device connected to each port. Any switch that is down or otherwise unavailable will not be populated in the table at the time the switches are queried. As will be described below in the connection with the automatic detection and update process 400 of FIG. 11, the switch state table is preferably truncated (all rows and data are removed) and re-populated at each execution of the process to update the dynamic mapping data. As mapping information is detected, new rows are inserted in the table and the detected information is populated into the appropriate fields.

Figure 7:
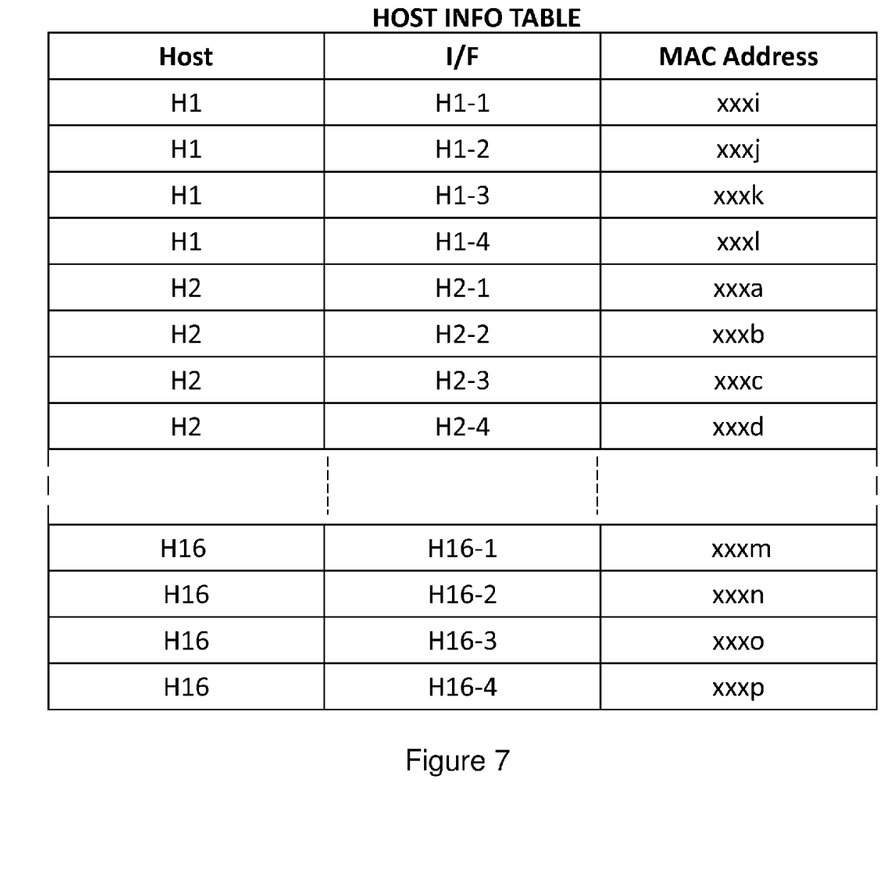
FIG. 7 illustrates a host information table in accordance with the invention.
Figure 8:
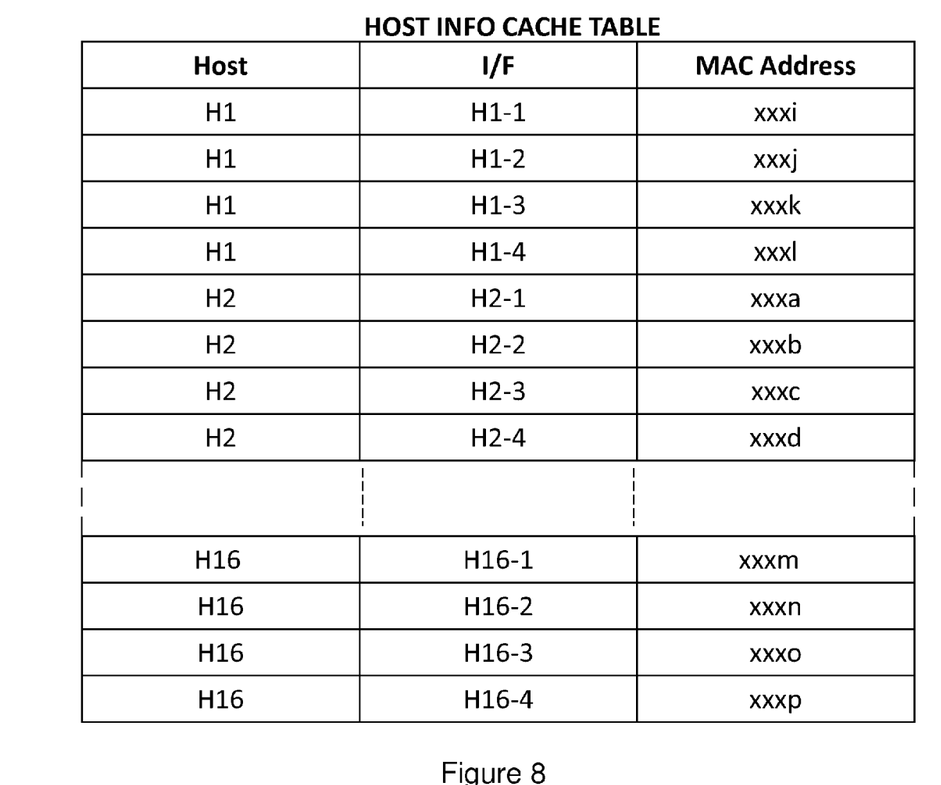
FIG. 8 illustrates a host information cache table in accordance with the invention.

FIGS. 7 and 8 illustrate, respectively, preferred embodiments of a host info table and a host info cache table. The two tables have similar structures and contain similar information. The tables have three columns that contain the hostname of each host in the logical cluster host table (FIG. 4), the host network interface (I/F) name(s), as a string, of each host, and the corresponding MAC address of each host network interface. Any host listed in the logical cluster host table that cannot be accessed because it is down or otherwise unavailable will not be included in the host info table (FIG. 7). As will be described, the host info table is truncated and re-populated at each update of the dynamic mapping data process 400.

The host info cache table (FIG. 8) is updated at each update of the dynamic mapping data after the host info table (FIG. 7) is truncated and re-populated. The host info cache table, however, is not truncated. Any hosts that are no longer in the logical cluster host table may be removed from the host info cache table, and any records that are present in the host info table following re-population will have corresponding records inserted or updated in the host info cache table. The difference between the host info table and the host info cache table is that the host info table will contain all current data that the process 400 has found during its last mapping update round, whereas the host info cache table contains information on any host currently present in the logical cluster including any host not detected during the current update round for which information had previously been stored. Any row that already exists in the host info cache table will be updated, and any new rows that are discovered for a new host will be added. Thus, the host info cache table includes the data prior to the last update, and has the best available information on the logical cluster, even if it is not exactly current because some hosts are not accessible. The information in the host info cache table need not be used unless necessary. It serves as a good backup source for the cluster mapping information.

Figure 9:
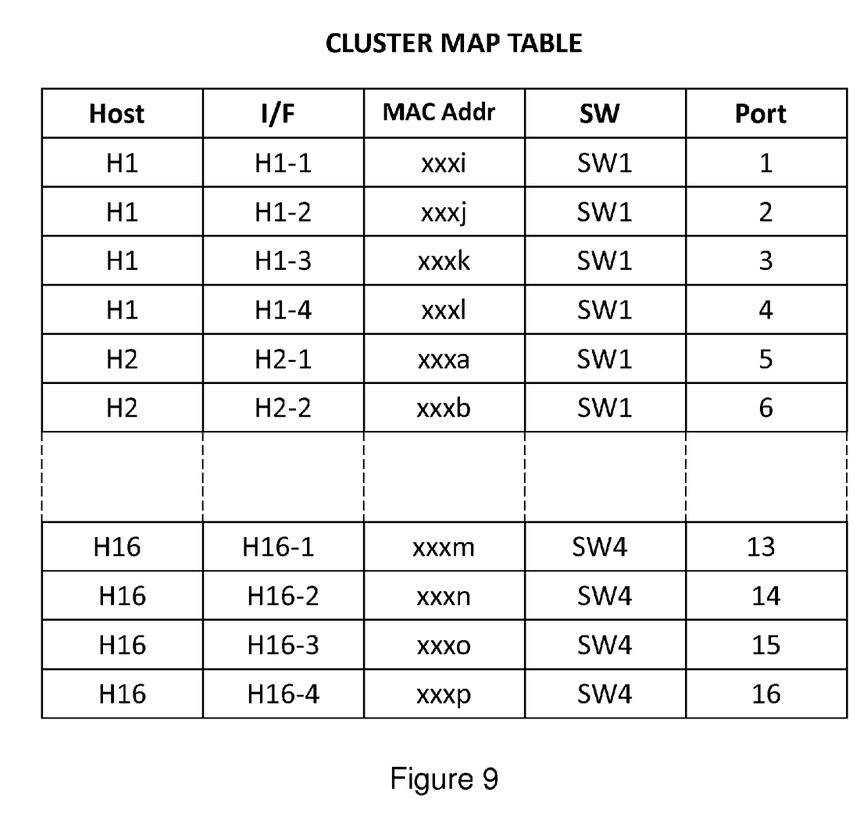
FIG. 9 illustrates a cluster map table in accordance with the invention.
Figure 10:
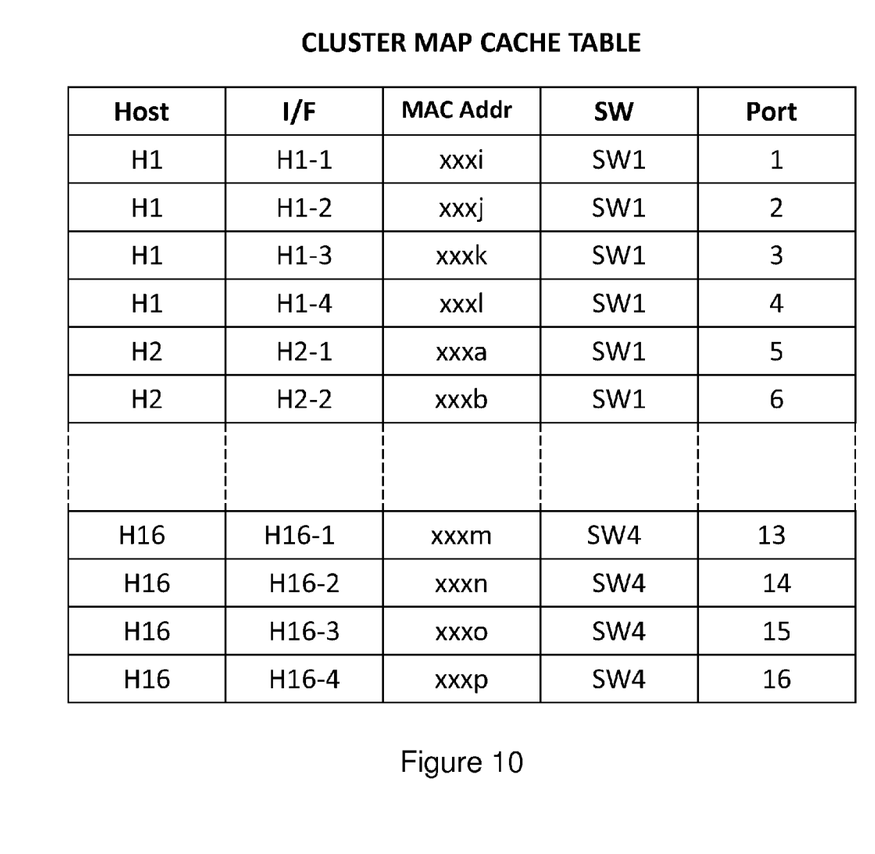
FIG. 10 illustrates a cluster map cache table in accordance with the invention.

FIGS. 9 and 10 illustrate, respectively, preferred embodiments of a cluster map table and a cluster map cache table. The tables have similar structures and contain similar data. The tables may have five columns that indicate for each host and host interface corresponding MAC addresses, switches and ports. The cluster map table represents the final usable data result set that contains the current mapping of host names and network interfaces to switch names and switch ports. The cluster map table will be truncated and re-populated in each round of the mapping process of FIG. 11. Re-population of the cluster map table will add all records that have a corresponding entry in the host info table (FIG. 7) and the switch state table (FIG. 6). This handles the situation where both hosts and switches are up and available. Re-population may also add all records that have corresponding entries from the host info cache table (FIG. 8) and the switch state table, but do not have a corresponding record in the host info table and switch state table. A join of all columns should be included. This handles the case where a switch is up and available but a corresponding host is not up and available. Re-population may further insert all records that are in the cluster map cache table but have not yet been added to the cluster map table. The key for comparison may be the hostname and the interface name. This will obtain all records for a network switch that is down and the data for which has already been collected in a previous round of collection.

The cluster map cache table (FIG. 10) contains the cluster map data from the previous round of data collection. It may be used for updating the cluster map table. Following each update round of the cluster map table, the cluster map cache table may be truncated and re-populated with the data from the cluster map table. Thus, like the host info cache table, the cluster map cache table serves as a backup source of data in the event that the update process fails for any reason or if any hosts that were previously accessible become no longer accessible temporarily or permanently.

Figure 11:
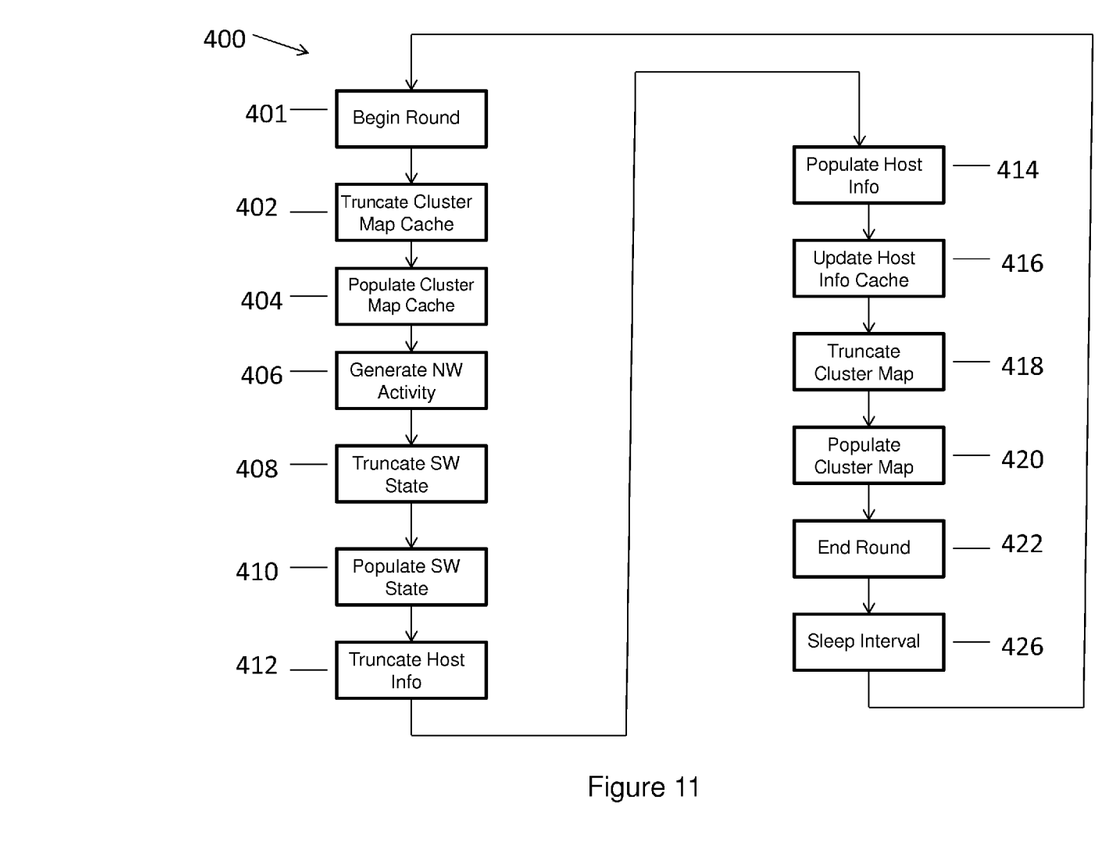
FIG. 11 illustrates a resilient cache-based topology detection process in accordance with the invention.

FIG. 11 illustrates a preferred embodiment of a resilient cache-based topology detection and dynamic cluster mapping process 400 in accordance with the invention. As will be described, the process comprises a series of operations in a particular order as well as table data manipulations that will take a current state of the cluster and update the table data to reflect the best currently available information from the cluster map table. Each time the data is updated is referred to as a round of collection and update. Following each round, there may be a sleep interval before the next round. The sleep interval may be selected and adjusted by an administrator based upon factors such as the size and speed of the hardware infrastructure. The sleep interval between data update rounds may be between about one second and one hour, for example. As noted above, the process of FIG. 11 may be embodied in computer executable instructions stored on non-transitory computer readable media that control the operations of a master host of the logical cluster.

Prior to beginning the topology detection and update process of FIG. 11, the logical cluster host table (FIG. 4) and the switch cluster table (FIG. 5) are preferably first populated, as previously described. Referring to FIG. 11, the process 400 begins at 401. At step 402 the cluster map cache table (FIG. 10) is truncated, and, at step 404, the cluster map cache table is populated with all rows in the cluster map table (FIG. 9). At step 406, the process creates activity on all interfaces of the cluster. This may be accomplished by using, for example, TCP/IP traffic from the master node to all nodes listed in the logical cluster table. This is useful to ensure that each host in the logical cluster is recognized by the switches, since the switches have to process traffic for each host. As an optimization of the process, step 406 need not be repeated in each round of updates if traffic has been created for a given node during a recent update round.

At step 408, the switch state table (FIG. 6) is truncated. A query may be made from each switch in the switch cluster table (FIG. 5) having a port with a MAC address registered to it, and the switch state table re-populated at 410. Next, at 412 the host info table (FIG. 7) may be truncated, and re-populated at 414 by connecting to each host listed in the logical cluster host table (FIG. 4) and querying the host for all network interfaces and the MAC addresses of those interfaces. The resulting data can be inserted into the host info table (FIG. 7) to re-populate the table. At 416 data in the host info cache table (FIG. 8) can be updated and any new data inserted. Any rows that already exist in the host info cache table will be updated, and any new rows will be added.

At 418, the cluster map table (FIG. 9) may be truncated, and at 420 the table may be re-populated. To re-populate the cluster map table, an SQL inner join may be performed using a key present in both the host info table and the host info cache table, such as MAC address, to add matching records from the host info table (FIG. 7) and the switch state table into the cluster map table (FIG. 9). Next, the process finds the keys, host names and interface names that are present in the host info cache table but not present in the host info table. A SQL inner join may be performed using as a key the MAC address of the records in the switch state table, and the matching rows may be inserted into the cluster map table. Finally, records from the cluster map cache table may be inserted into the cluster map table using as keys host names and interface combinations that are present in the cluster map cache table but are not present in the cluster map table are inserted into the cluster map table. Significantly, the join process combines the live current topology information just detected with the topology information present in the cluster map cache table. The resulting re-populated cluster map table thus contains not only the most current information on the topology of the logical cluster, but also the previously determined topology information. Accordingly, not only will newly added or reconfigured switches or hosts will be detected and added to the network topology, but also in the event a host or a switch fails, and therefore not detected in an update round, administrative personnel will have available the previous topology information to assist in troubleshooting and reconfiguring the network.

At step 422, the update round of the process 400 ends and the process enters a sleep interval at 424, the length of which is configurable, as explained above. Following the sleep interval, the process returns to 401 and begins a new update round.

As will be appreciated from the foregoing, the invention provides a resilient cache-based topology detection process for a dynamic cluster that provides current real-time information on the network topology. The process is resilient in the sense that if a switch or a processing node is down during an update, topology information will still be obtained from cache tables. Since the process is cache-based, the information will comprise not only currently detected topology information, but also topology information that may be currently undetectable because a switch or a host is down. Conveniently, since logical clusters of the type with which the invention is concerned are dynamic, meaning that the topology changes rapidly, the automatic topology detection process of the invention allows administrators to reconfigure a system as needed to remove or to add new components without the necessity of having to manually document the topology changes.

Network topology information detected by the process of the invention may be presented to network administrators in a variety of ways. One particularly convenient presentation method is to display a real time graphical pictorial representation of the network layout on a computer display using graphical user interface (GUI) technology, in addition to displaying the information contained cluster map table or in one or more of the other various tables described above. Graphical displays of the network topology and data may be obtained using well known and readily available software.

While the foregoing has been with respect to a particular embodiment of the invention, it will be appreciated by those skilled in the art that changes to this embodiment may be made without departing from the principles and spirit the invention, the scope of which is defined by the appended claims.

The invention claimed is:

1. A method of automatically detecting and mapping the topology of a dynamically changing logical cluster of a network data center comprising a plurality of hosts and a plurality of network switches, the method being performed automatically by a machine and comprising:

assigning selected hosts and selected switches to said logical cluster, and listing said selected hosts and said selected switches in respective logical cluster host and logical cluster switch tables, said tables being updated as said assigned hosts and switches change;

creating activity on all host and switch network interfaces of the logical cluster;

truncating a switch state table by deleting data in the switch state table that lists switch names and MAC addresses of hosts previously determined to be connected to ports of the switches and repopulating the switch state table with MAC addresses of hosts determined by said activity to be currently connected to the ports of each selected switch listed in said logical cluster switch table, any switch listed in the logical cluster switch table that is currently unavailable being excluded from said repopulating of the switch state table;

truncating a host information table that lists hostnames and MAC addresses of network interfaces to hosts by deleting previously determined host information table data and repopulating said host information table with MAC addresses of network interfaces of the selected hosts listed in said logical cluster host table, any host that is determined by said activity to be currently unavailable being excluded from said repopulating of said host information table;

updating, without truncating, a host information cache table with data from said host information table following said truncating and repopulating said host information table, said updating comprising updating existing data in said host information cache table by removing any host from said host information cache table that is not currently listed in the logical cluster host table and inserting any new data from said host information table;

truncating a cluster map table by deleting previously determined map data that indicates a previous topology mapping of said logical cluster, and repopulating said cluster map table by joining switch records in said switch state table with host records in said host information table, joining records in said host information cache table with records in said switch state table, and by adding records from a cluster map cache table that contains previous logical cluster map information not currently in said cluster map table to provide a current logical cluster topology mapping; and iterating said foregoing steps at predetermined intervals to maintain current said logical cluster topology mapping.

2. The method of claim 1 further comprising using cached host information and cached cluster map information from a previous iteration of said method to supplement current data in said cluster map table to provide a map of said logical cluster.

3. The method of claim 2 further comprising first determining a first MAC address identifying the network interface of each of said hosts, and second determining a second MAC address identifying the host connected to each port of said plurality of switches, said records including said first and said second MAC addresses, and wherein said joining comprises joining said host information and said switch state information using MAC address as a key.

4. The method of claim 1 further comprising finding records comprising hostnames and interfaces that are present in the host information cache table but not in the host information table, joining such records with switch state table records, and updating said cluster map table with the results of said joining.

5. The method of claim 4, as wherein said records comprise host information and switch state information, and wherein said joining said records comprises performing an SQL inner join of records using a key present in both of said host information cache table and said switch state table.

6. The method of claim 5 further comprising storing information from said cluster map table in a cluster map cache table, and using said cluster map cache table to supplement said cluster map table to include host-switch network connections not detected activity on said logical cluster to provide said current logical cluster topology mapping.

7. The method of claim 6 further comprising storing said tables in a database.

8. The method of claim 1 further comprising finding records comprising hostnames and interfaces that are present in a cluster map cache table that contains previous cluster map data, and updating said cluster map table using such records.

9. The method of claim 1 further comprising determining whether a host that was previously identified as being part of said logical cluster but which is currently determined to be unavailable has been moved to another switch port, and, if so, inserting corresponding switch and host connection data into said cluster map table.

10. Computer readable non-transitory storage medium product embodying instructions for controlling the operation of a computer to automatically detect and map the topology of a dynamically changing logical cluster of a network data center comprising a plurality of hosts interfaced to a plurality of network switches, comprising instructions for:

assigning selected hosts and selected switches to said logical cluster, and listing said selected hosts and said selected switches in respective logical cluster host and logical cluster switch tables, said tables being updated as said assigned hosts and switches change;

creating activity on all host and switch network interfaces of the logical cluster;

truncating a switch state table by deleting data in the switch state table that lists switch names and MAC addresses of hosts previously determined to be connected to ports of the switches and repopulating the switch state table with MAC addresses of hosts determined by said activity to be currently connected to the ports of each selected switch listed in said logical cluster switch table, any switch listed in the logical cluster switch table that is currently unavailable being excluded from said repopulating of the switch state table;

truncating a host information table that lists hostnames and MAC addresses of network interfaces to hosts by deleting previously determined host information table data and repopulating said host information table with MAC addresses of network interfaces of the selected hosts listed in said logical cluster host table, any host that is determined by said activity to be currently unavailable being excluded from said repopulating of said host information table;

updating, without truncating, a host information cache table with data from said host information table following said truncating and repopulating said host information table, said updating comprising by removing any host from said host information cache table that is not currently listed in the logical cluster host table and updating existing data in said host information cache table and inserting any new data from said host information table;

truncating a cluster map table by deleting previously determined map data that indicates a previous topology mapping of said logical cluster and repopulating said cluster map table by joining switch records in said switch state table with host records in said host information table, joining records in said host information cache table with records in said switch state table, and by adding records from a cluster map cache table that contains previous logical cluster map information not currently in said cluster map table to provide a current logical cluster topology mapping; and iterating said foregoing steps at predetermined intervals to maintain current said logical cluster topology mapping.

11. The computer readable product of claim 10 further comprising using cached host information and cached cluster map information from a previous iteration of said method to supplement current data in said cluster map table to provide a map of said logical cluster.

12. The computer readable product of claim 11 further comprising first determining a first MAC address identifying the network interface of each of said hosts, and second determining a second MAC address identifying the host connected to each port of said plurality of switches, said records including said first and said second MAC addresses, and wherein said joining comprises joining said host information and said switch state information using MAC address as a key.

13. The computer readable non-transitory storage medium product of claim 10 further comprising finding records comprising hostnames and interfaces that are present in the host information cache table but not in the host information table, joining such records with switch state table records, and updating said cluster map table with the results of said joining.

14. The computer readable product of claim 13, as wherein said records comprise host information and switch state information, and wherein said joining said records comprises performing an SQL inner join of records using a key present in both of said host information cache table and said switch state table.

15. The computer readable product of claim 14 further comprising instructions for storing information from said cluster map table in a cluster map cache table, and using said cluster map cache table to supplement said cluster map table to include host-switch network connections not detected activity on said logical cluster to provide said current logical cluster topology mapping.

16. The computer readable non-transitory storage medium product of claim 10 further comprising finding records comprising hostnames and interfaces that are present in a cluster map cache table that contains previous cluster map data, and updating said cluster map table using such records.

17. The computer readable non-transitory storage medium product of claim 10 further comprising determining whether a host that was previously identified as being part of said logical cluster but which is currently determined to be unavailable has been moved to another switch port, and, if so, inserting corresponding switch and host connection data into said cluster map table.

* * * * *